(No Model.)　　　　　　H. WELLER.　　　　2 Sheets—Sheet 1.
CORN HARVESTER.

No. 525,375.　　　　　　　　Patented Sept. 4, 1894.

Witnesses:
Ray H. Hutchins.
Herbert Cowell.

Inventor:
Henry Weller By
Thos. H. Hutchins his atty (No Model.)
2 Sheets—Sheet 2.

H. WELLER.
CORN HARVESTER.

No. 525,375.    Patented Sept. 4, 1894.

Witnesses:
Ray Hutchins
Herbert Cowell

Inventor:
Henry Weller By
Thos. H. Hutchins his atty

UNITED STATES PATENT OFFICE.

HENRY WELLER, OF PLAINFIELD, ILLINOIS.

CORN-HARVESTER.

SPECIFICATION forming part of Letters Patent No. 525,375, dated September 4, 1894.

Application filed October 12, 1893. Serial No. 487,944. (No model.)

*To all whom it may concern:*

Be it known that I, HENRY WELLER, a citizen of the United States of America, residing at Plainfield, in the county of Will and State of Illinois, have invented certain new and useful Improvements in Corn-Harvesters, of which the following is a specification, reference being had therein to the accompanying drawings and the figures of reference thereon, forming a part of this specification, in which—

Figure 1:
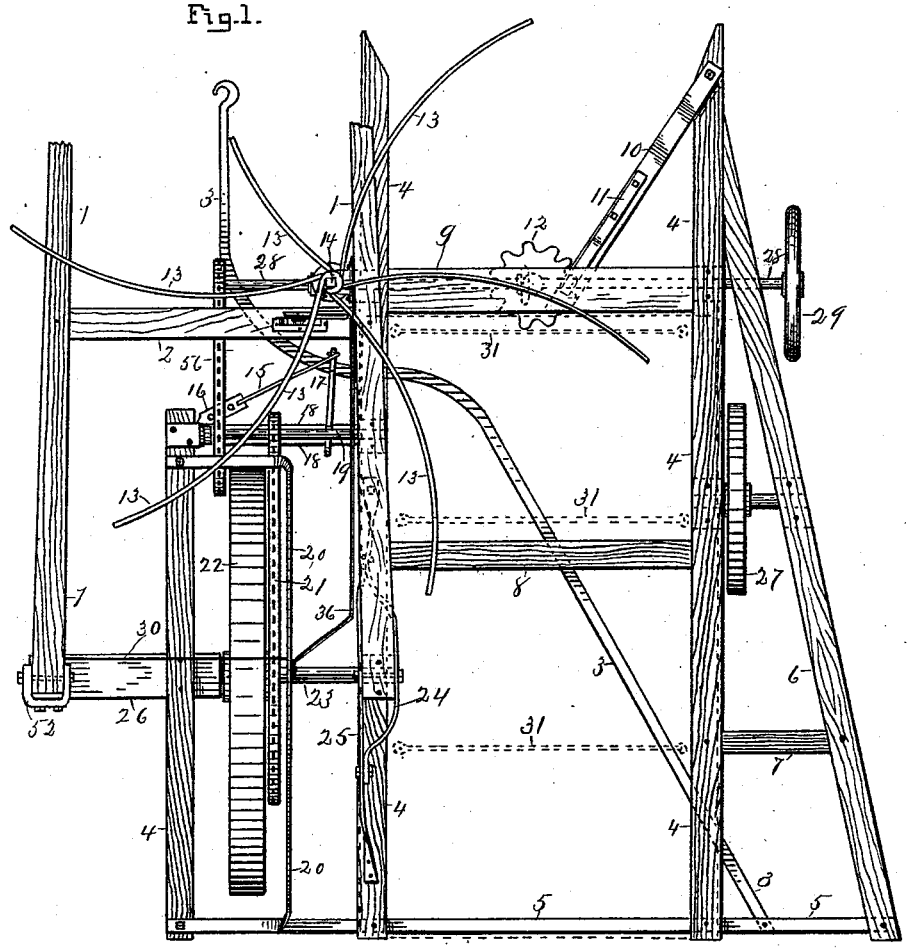
Figure 2:
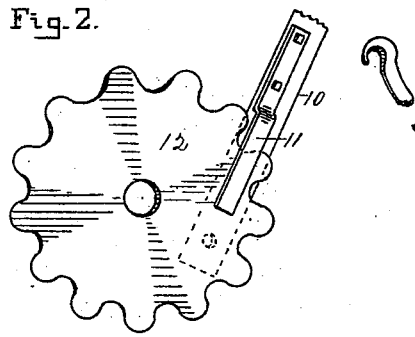
Figure 3:
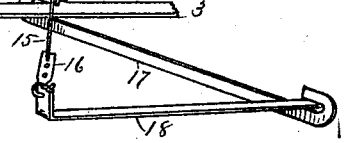
Figure 4:
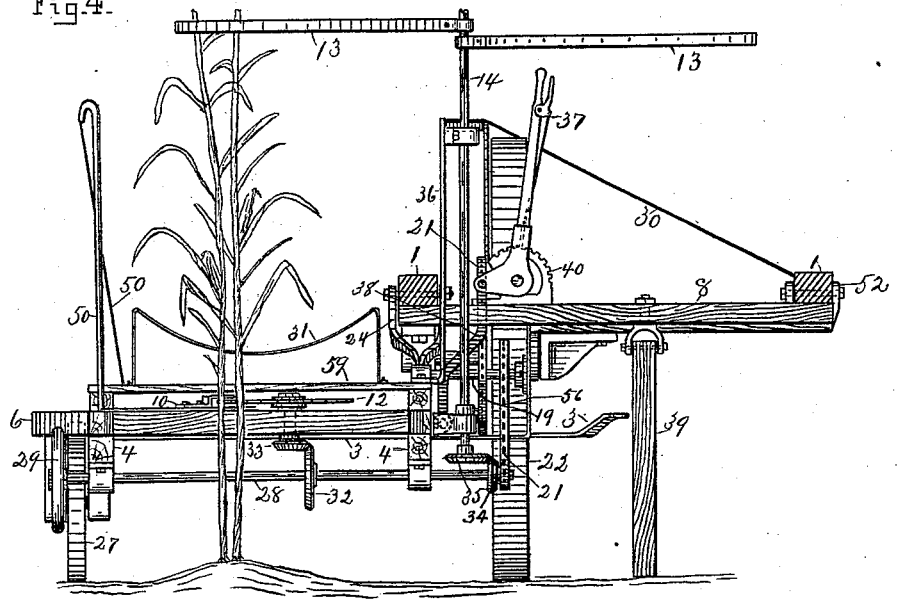
Figure 5:
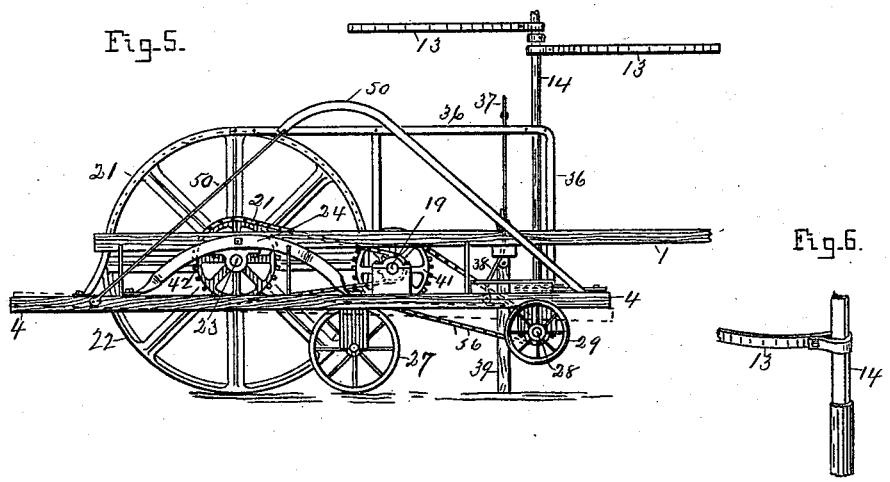
Figure 6:
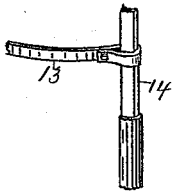

Figure 1 is a plan view of the machine omitting the floor and the forward portion of the shafts. Fig. 2 is a side view of the scalloped rotary cutting wheel and a plan of the stationary knife and its guard against which the scalloped rotary cutting wheel cuts. Fig. 3 is a detail showing a portion of the draft rod and its attachments. Fig. 4 is a front elevation of the machine. Fig. 5 is a side elevation looking at Fig. 4 from the left side of the figure. Fig. 6 is a perspective view of the upper end of the reel post, and of a portion of one of its curved arms attached thereto.

This invention relates to certain improvements in corn harvesters, of the class that travels and cuts the stalks of corn as they stand in the row until enough is collected on the machine to form a stout bundle, which improvements are fully set forth and explained in the following specification and claim.

Referring to the drawings, 4, 5, 7, 9, and 26 represent the bed sills or frame of the machine supported at one side by the drive wheel 22 secured on a shaft 23 journaled in proper boxes on the under side of the main frame, and supported at its opposite side by the traveling wheel 27, the shaft of which is journaled in boxes on the under side of frame 4 and on the under side of a fender 6 attached to that side of the machine.

A pair of thills 1 are pivotally attached at their rear ends to the top of the machine frame by means of the clips 24 and 52 and the two thills are connected by means of a cross bar 2 upon which is mounted a notched segment 40 to which is pivotally connected a hand lever 37 having an ordinary spring bolt for engaging said segment, and by means of which hand lever mechanism the forward end of the machine frame may be vertically adjusted by means of its connection with said hand lever through the medium of the rod 38. Said cross bar 2 is provided on its under side with a supporting post 39 pivotally connected to its under side for supporting the outer end of the thills 1 from the ground and for maintaining the machine in a horizontal position when at rest.

12 is a rotating knife having a scalloped cutting peripheral edge and is secured on the upper end of a short vertical shaft journaled in one of the cross beams of the main frame of the machine as shown in Fig. 4. The lower end of the shaft of said rotating knife is provided with a bevel gear 33 which meshes with and is driven by the bevel gear 32, on a shaft 28 journaled to the under side of the main frame. The scallops of the peripheral cutting edge of said rotating knife are made large so that several stalks may enter one of the scallops at once, which prevents the knife from clogging as in the case where said knife is provided with ordinary saw teeth for a cutting edge, between which there is not sufficient room to receive whole stalks. It is found that it is an improvement to provide the rotary knife with such a scalloped cutting edge instead of ordinary saw teeth for the reason stated. Said shaft 28 is provided with a balance wheel 29 on its outer end for preserving a steady motion to the knife 12, and is provided with a sprocket wheel on its inner end for receiving a sprocket chain 56 which passes over a sprocket wheel on shaft 19, and the shaft 19 is provided with another sprocket wheel arranged about centrally thereon, which is driven by means of sprocket chain 21 from sprocket wheel 42 on shaft 23 of the drive wheel 21, so that the knife 12 is driven by the drive wheel 21 through the medium of said sprocket wheels, chains and shafts and said bevel gear.

10 is a diagonally arranged knife secured to the main frame in such position that the rotating knife 12 will cut with it, as shown in Fig. 1, and it is provided with a guard 11 secured to it in such position that the rotating knife may enter between said guard and knife 10, for the purpose of causing the cutting off of the stalks to be more certain.

A reel post 14 having a series of curved radial arms secured to its upper end is located to stand in the forward part of the machine at one side of the rotating knife 12 and is provided on its lower end with a bevel gear 35 which meshes with and is driven by the bevel gear 34 secured on the shaft 28. The upper part of said reel post is journaled in a box secured to a guard box or standard 36. Said curved reel arms serve to gather the standing corn stalks in and lay them over on the machine after they are cut off on to a series of curved holding bars 31 one of which is shown in full lines in Fig. 4 as attached to the upper side of the floor 59, and others are shown in broken lines in Fig. 1.

In Fig. 1 the floor is omitted in order to show the frame below it and the draft mechanism which consists of the long rod or bar 3 having its rear end pivotally attached to the lower side of the frame near its rear outer corner and its hooked forward end extending between the two thills to the proper place at which to attach a team, a bar 17 having a hook at its forward end for hooking over rod 3 and a hook at its rear end for hooking over a bar 18 attached to the under side of the main frame, a rod 15 connected to the forward end of bar 17, and having a hook at its opposite end adapted to hook into a series of holes in a plate 16 attached to the outer end of the bar 18, all arranged as shown in Figs. 1 and 3. By adjusting the hooked rod 15 in the holes of plate 16 the forward end of the draft rod 3 may be laterally adjusted to regulate the side draft of the machine.

20 is a fender to shield the drive wheel from the cut off corn held in proper position by means of a brace 30. 50 is also a fender attached to the outer side of the machine for preventing corn stalks from falling off that side of the machine.

In operation a team is attached to the forward end of the draft bar 3 between the thills 1, as the machine advances the rotating knife cuts off the corn stalks at the height desired by the adjustment to the machine, and as they are cut fall into the curved holders 31 where they are intended to be tied into bundles and removed by an attendant on the machine.

Having thus described my invention, what I claim as new, and desire to secure by Letters Patent, is as follows, to wit:

In a corn harvester, the combination of the main frame, the draft rod 3 pivotally connected at its rear end to the rear end of the machine, hooked bar 17, hook 15, and perforated plate 16 all arranged to operate substantially as and for the purpose set forth.

HENRY WELLER.

Witnesses:
THOS. H. HUTCHINS,
JOHN VAN HORN.